(12) United States Patent
Karakotsios et al.

(10) Patent No.: US 10,001,838 B2
(45) Date of Patent: Jun. 19, 2018

(54) FEATURE TRACKING FOR DEVICE INPUT

(71) Applicant: Amazon Technologies, Inc., Reno, NV (US)

(72) Inventors: Kenneth M. Karakotsios, San Jose, CA (US); Dong Zhou, San Jose, CA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 154 days.

(21) Appl. No.: 14/533,985

(22) Filed: Nov. 5, 2014

(65) Prior Publication Data
US 2015/0062006 A1 Mar. 5, 2015

Related U.S. Application Data

(63) Continuation of application No. 13/359,728, filed on Jan. 27, 2012, now Pat. No. 8,902,198.

(51) Int. Cl.
| | | |
|---|---|---|
| *G06F 3/042* | (2006.01) | |
| *G06F 3/01* | (2006.01) | |
| *G06F 3/03* | (2006.01) | |
| *G06K 9/00* | (2006.01) | |

(52) U.S. Cl.
CPC ............ *G06F 3/017* (2013.01); *G06F 3/0304* (2013.01); *G06F 3/042* (2013.01); *G06K 9/00355* (2013.01)

(58) Field of Classification Search
CPC ........ G06F 3/017; G06F 3/0304; G06F 3/042; G06F 3/0425
See application file for complete search history.

(56) References Cited

U.S. PATENT DOCUMENTS

| | | | |
|---|---|---|---|
| 2004/0120583 A1* | 6/2004 | Zhai ...................... | G06K 9/222 382/229 |
| 2005/0210417 A1* | 9/2005 | Marvit .................. | G06F 1/1613 715/863 |
| 2009/0315740 A1* | 12/2009 | Hildreth .................. | G06F 3/017 341/20 |
| 2010/0050133 A1 | 2/2010 | Nishihara et al. | |
| 2010/0199232 A1 | 8/2010 | Mistry et al. | |
| 2010/0259473 A1 | 10/2010 | Sakata et al. | |
| 2011/0093821 A1 | 4/2011 | Wigdor et al. | |
| 2011/0173530 A1 | 7/2011 | Winternitz et al. | |
| 2011/0197263 A1 | 8/2011 | Stinson, III | |
| 2012/0036469 A1 | 2/2012 | Suraqui | |
| 2012/0042288 A1* | 2/2012 | Liao .................. | H04N 1/00129 715/863 |
| 2012/0127080 A1 | 5/2012 | Kushler et al. | |
| 2012/0242579 A1 | 9/2012 | Chua | |

* cited by examiner

*Primary Examiner* — Adam R Giesy
(74) *Attorney, Agent, or Firm* — Polsinelli LLP

(57) ABSTRACT

A user can emulate touch screen events with motions and gestures that the user performs at a distance from a computing device. A user can utilize specific gestures, such as a pinch gesture, to designate portions of motion that are to be interpreted as input, to differentiate from other portions of the motion. A user can then perform actions such as text input by performing motions with the pinch gesture that correspond to words or other selections recognized by a text input program. A camera-based detection approach can be used to recognize the location of features performing the motions and gestures, such as a hand, finger, and/or thumb of the user.

19 Claims, 7 Drawing Sheets

*- Prior Art -*

*- Prior Art -*

FEATURE TRACKING FOR DEVICE INPUT

CROSS-REFERENCES TO RELATED APPLICATIONS

This application is a continuation of U.S. patent application Ser. No. 13/359,728, entitled "FEATURE TRACKING FOR DEVICE INPUT" filed Jan. 27, 2012, and issued as U.S. Pat. No. 8,902,198 on Dec. 2, 2014, which is incorporated herein by reference for all purposes.

BACKGROUND

People are increasingly utilizing portable electronic devices to perform a wide variety of tasks. While the small size and light weight of these devices provide various advantages, these aspects come with certain limitations as well. For example, the size of a display screen on many of these devices is relatively small, less than four inches diagonally in many instances, such that it can be difficult to precisely select items displayed on a touch screen. When attempting to type on a touch screen, for example, the relative size of the human finger to the touch screen makes it difficult for certain users to accurately provide text input, as it is difficult to accurately select all the individual letters or other virtual keys needed for the input. Certain motion- or pattern-based approaches to providing text input are being used as well, such as Swype® input available from Nuance Communications, Inc. In many cases, however, it still can be difficult to accurately provide the necessary input on the device for these motions. Further, such input techniques typically require contact with the touch screen, which can be inconvenient for the user in certain situations and can lead to dirt and oil on the touch screen, among other such issues. Further still, certain users would like to be able to use these motion-based inputs with electronic devices, portable or otherwise, that may not have touch screens or similar elements. Larger electronic devices, such as televisions and other such display mechanisms, suffer from at least some of the same types of problems.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to providing input to an electronic device. In particular, various embodiments enable a user to provide various types of input to an electronic device using motions or gestures performed at a distance from the device. In at least some embodiments, a user is able to perform gestures within a field of view of one or more cameras of a computing device. A specific gesture, such as a pinching or touching together of a finger and a thumb on a hand of the user, can designate portions of the motion that are to be used to provide input. For example, a user can move the user's fingers to a relative position with respect to the device that corresponds to the first letter of a word that the user intends to input to the device. The user can then pinch the user's fingers together, or perform another such gesture, indicating that the position should be registered as input. The user can keep the fingers pinched together while making a motion with a particular pattern, and that motion can also be registered as input while the fingers are pinched together. When the user is finished with the input, such as at the end of a word using pattern-based input, the user can unpinch the fingers, or perform another such motion, to indicate that any subsequent motion should not be registered as part of the input (unless otherwise indicated). In addition to text input, various other types of motion- or pattern-based inputs can be used as well as discussed and suggested elsewhere herein.

Various other applications, processes, and uses are presented below with respect to the various embodiments.

Figure 1A:
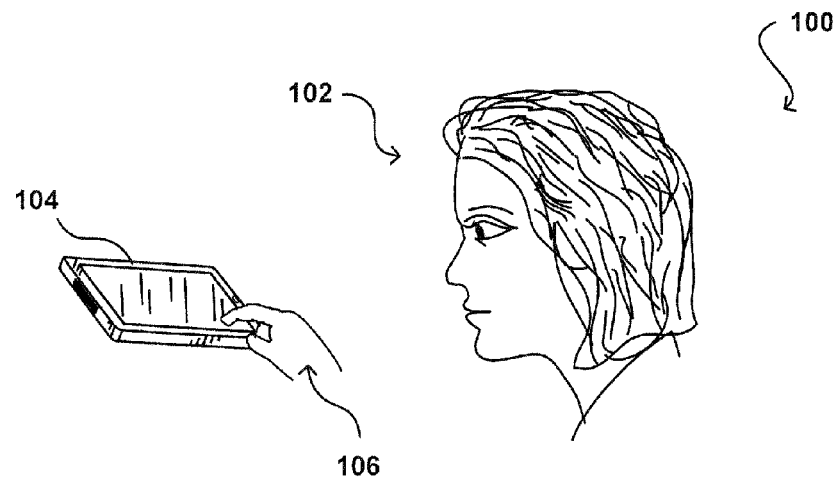
FIGS. 1(a) and 1(b) illustrate an example of a user providing motion-based input using a virtual keyword displayed on a display screen of an electronic device using a conventional technique of the prior art.
Figure 1B:
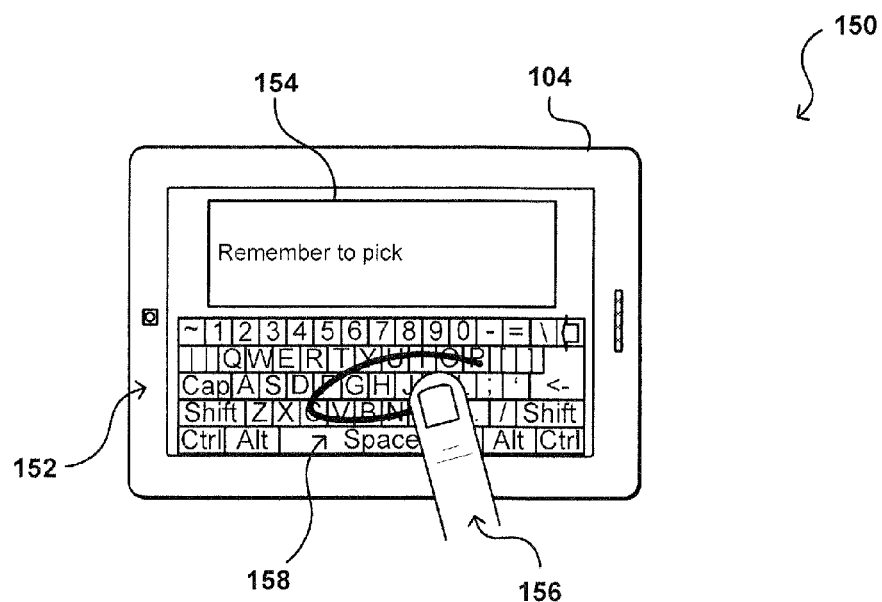

As discussed, certain conventional approaches enable a user to provide input to a device through contact with the device. For example, FIG. 1(a) illustrates an example situation 100 wherein a user 102 is able to provide input to a computing device 104 by applying pressure to a touch screen, or other such element of the device, using at least one finger of the user's hand 106, or another such object. As mentioned, a touch screen can be used to provide conventional text input, such as by pressing on virtual keys of a keyboard displayed on a touch screen of the device. Certain devices include software and/or interfaces that enable a user to provide input using motion-based input. For example, FIG. 1(b) illustrates an example situation 150 wherein the user is contacting a virtual keyboard 152 displayed on a touch-sensitive screen of the computing device 104. In this example, the user's finger 156 is tracing a path or pattern 158 across letters on the screen that form the word "pick," in order to cause that word to be entered into a text box 154 of the interface. It should be understood that the pattern 158 shown is just an example, and that there can be various patterns used to enter this and other words and information in accordance with various embodiments.

In the example of FIG. 1(b), the device knows the start and end points of the input based upon the point at which the finger first contacts, or applies pressure to, the touch screen, as well as the point at which the finger no longer contacts, or applies pressure to, the touch screen, respectively. While the user's finger is applying a certain amount of pressure to the touch screen, or is within a determined proximity of the screen, for example, the device will determine the location of the touch screen where the user is applying pressure or hovering over, and will track that information during the motion. By knowing the approximate location where each letter (or other input element) of the keyboard is displayed on the touch screen, the software executing on the device (or on a system or service in communication with the device) can determine the letters contained within the pattern motion, and can look at various points where the pattern changes direction or deviates by a certain amount, and can use this information to determine a word or other input which the user intended to provide. Approaches for determining character strings and other such input corresponding to a pattern provided with respect to an object such as a virtual keyboard are known in the art and, as such, will not be discussed here in detail. As mentioned, one example of such input is Swype typing input, although text predictive algorithms and approaches can be used as well as would be apparent to one or ordinary skill in the art in light of the teachings and suggestions contained herein.

Figure 2A:
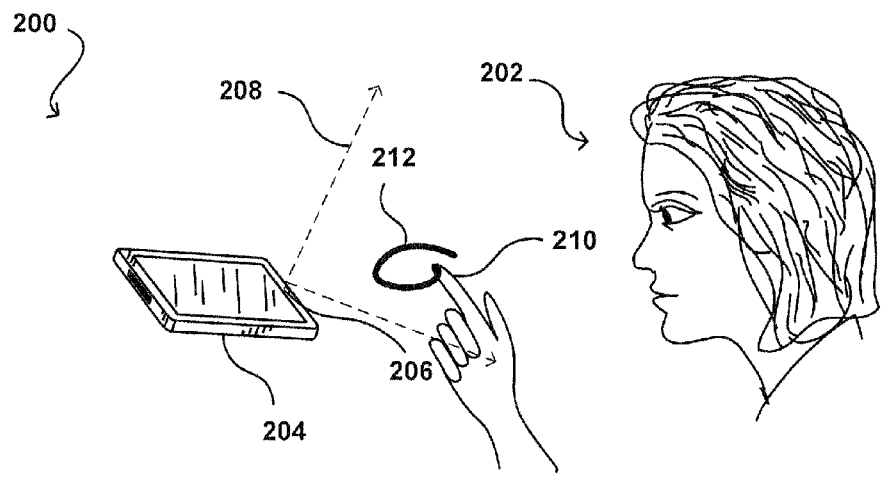
FIGS. 2(a) and 2(b) illustrate an example process for providing motion- or gesture-based text input that can be used in accordance with various embodiments.

Systems and methods in accordance with various embodiments can utilize such pattern-techniques with motion- or gesture-determining systems to enable remote text input for electronic interfaces. In particular, computing devices can utilize one or more cameras or other sensors to determine and track motions made by a user within a field of view of the device. For example, FIG. 2(a) illustrates an example situation 200 wherein a user 202 is again attempting to input the word "pick" to a computing device 204. In this example, however, the user is tracing out the appropriate pattern 212 for the word using the user's finger (although other such features or objects can be used) within a field of view of a camera 206 of the computing device 204. The user can start the motion for the pattern 212 at a location relative to the computing device 204 that is associated with the first letter, here "p." The location can be determined using any appropriate procedure, but in at least some embodiments a device will assign certain angular regions of the field of view 204 of the camera to each input element on the interface displayed on the display screen of the device (or other such elements). In at least some embodiments, as discussed later herein, a virtual cursor can move with the fingers or the keys or inputs can have their appearance modified in order to provide the user 202 with feedback as to which key or input corresponds to the current location of the user's finger 210 relative to the device 204.

Figure 2B:
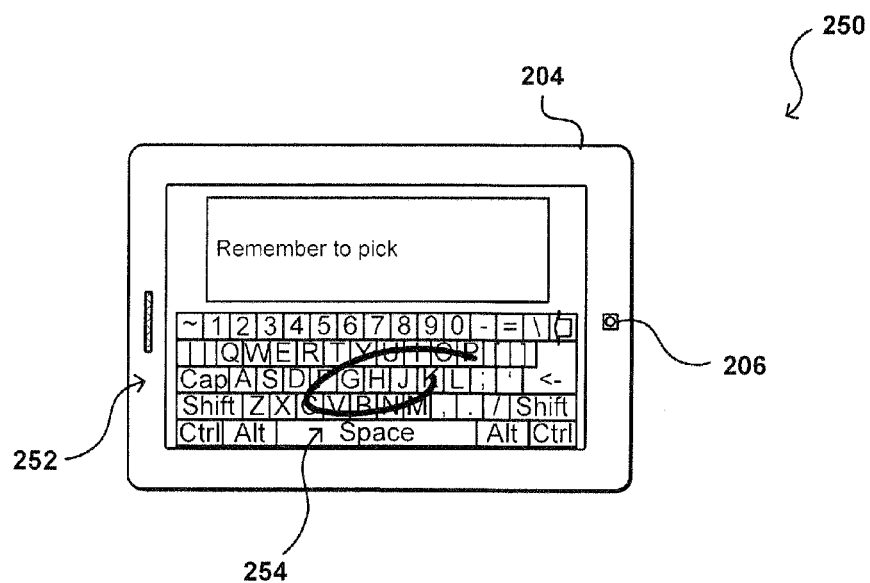

FIG. 2(b) illustrates how the motion 212 of the user's finger in FIG. 2(a) can be mapped to corresponding locations on the virtual keyboard 252 based on image information captured by the camera 206 of the device 204 even though the finger is a distance from the display screen. In some embodiments, the mapped pattern 254 can be displayed "over" the virtual keyboard in order to ensure that the proper motion was made by the user and determined by the device. In other embodiments, the keys under the motion can be highlighted or otherwise adjusted in appearance, a cursor can trace the pattern, or another such indicator can be used to convey to the user the input that is being detected.

Figure 3A:
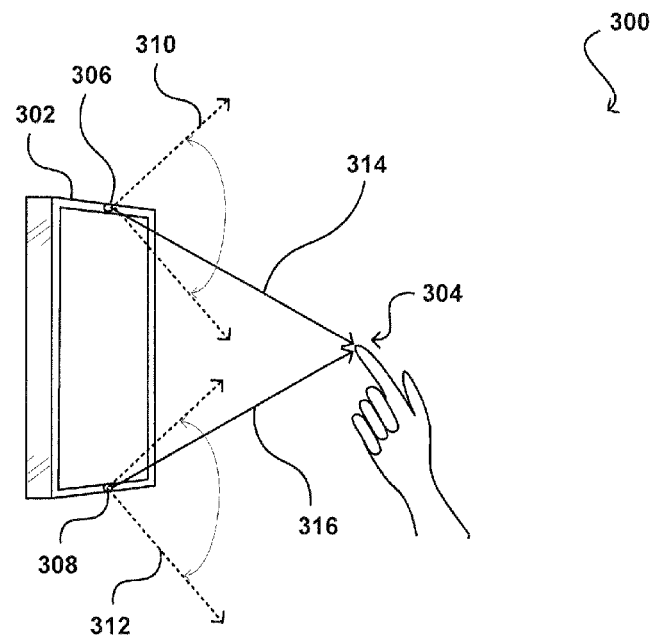
FIGS. 3(a), 3(b), and 3(c) illustrate an example process for locating the relative position of a user's hand or at least one finger that can be used in accordance with various embodiments.
Figures 3B, 3C:
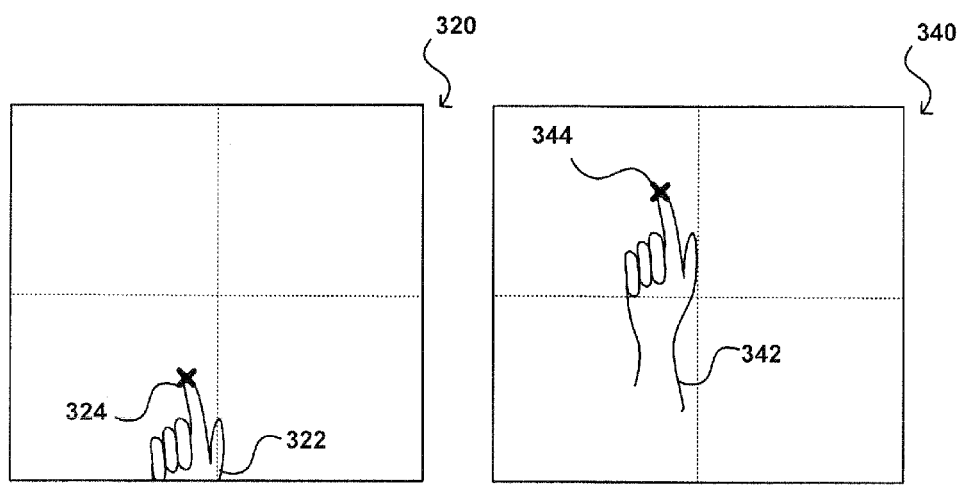

Approaches in accordance with various embodiments attempt to determine information such as the relative distance and/or location of a feature of the user that is capable of providing (or assisting in providing) such input. FIGS. 3(a), 3(b), and 3(c) illustrate one example approach to determining a relative direction and/or location of at least one feature of a user that can be utilized in accordance with various embodiments. In this example, input can be provided to a computing device 302 by monitoring the position of the user's fingertip 304 with respect to the device. In some embodiments, a single camera can be used to capture image information including the user's fingertip, where the relative location can be determined in two dimensions from the position of the fingertip in the image and the distance determined by the relative size of the fingertip in the image. In other embodiments, a distance detector or other such sensor can be used to provide the distance information. The illustrated computing device 302 in this example instead includes at least two different image capture elements 306, 308 positioned on the device with a sufficient separation such that the device can utilize stereoscopic imaging (or another such approach) to determine a relative position of one or more features with respect to the device in three dimensions. Although two cameras are illustrated near a top and bottom of the device in this example, it should be understood that there can be additional or alternative imaging elements of the same or a different type at various other locations on the device within the scope of the various embodiments. The cameras can include full color cameras, infrared cameras, grayscale cameras, and the like. Further, it should be understood that terms such as "top" and "upper" are used for clarity of explanation and are not intended to require specific orientations unless otherwise stated.

In this example, the upper camera 306 is able to see the fingertip 304 of the user as long as that feature is within a field of view 310 of the upper camera 306 and there are no obstructions between the upper camera and those features. If software executing on the computing device (or otherwise in communication with the computing device) is able to determine information such as the angular field of view of the camera, the zoom level at which the information is currently being captured, and any other such relevant information, the software can determine an approximate direction 314 of the fingertip with respect to the upper camera. If input is determined based only on relative direction to one camera, the approximate direction 314 can be sufficient to provide the appropriate input, with no need for a second camera or sensor, etc. In some embodiments, methods such as ultrasonic detection, feature size analysis, luminance analysis through active illumination, or other such distance measurement approaches can be used to assist with position determination as well.

In this example, a second camera is used to assist with location determination as well as to enable distance determinations through stereoscopic imaging. The lower camera 308 in FIG. 3(a) is also able to image the fingertip 304 as long as the features is at least partially within the field of view 312 of the lower camera 308. Using a similar process to that described above, appropriate software can analyze the image information captured by the lower camera to determine an approximate direction 316 to the user's fingertip. The direction can be determined, in at least some embodiments, by looking at a distance from a center (or other) point of the image and comparing that to the angular measure of the field of view of the camera. For example, a feature in the middle of a captured image is likely directly in front of the respective capture element. If the feature is at the very edge of the image, then the feature is likely at a 45 degree angle from a vector orthogonal to the image plane of the capture element. Positions between the edge and the center correspond to intermediate angles as would be apparent to one of ordinary skill in the art, and as known in the art for stereoscopic imaging. Once the direction vectors from at least two image capture elements are determined for a given feature, the intersection point of those vectors can be determined, which corresponds to the approximate relative position in three dimensions of the respective feature.

Further illustrating such an example approach, FIGS. 3(b) and 3(c) illustrate example images 320, 340 that could be captured of the fingertip using the cameras 306, 308 of FIG. 3(*a*). In this example, FIG. 3(*b*) illustrates an example image 320 that could be captured using the upper camera 306 in FIG. 3(*a*). One or more image analysis algorithms can be used to analyze the image to perform pattern recognition, shape recognition, or another such process to identify a feature of interest, such as the user's fingertip, thumb, hand, or other such feature. Approaches to identifying a feature in an image, such may include feature detection, facial feature extraction, feature recognition, stereo vision sensing, character recognition, attribute estimation, or radial basis function (RBF) analysis approaches, are well known in the art and will not be discussed herein in detail. Upon identifying the feature, here the user's hand 322, at least one point of interest 324, here the tip of the user's index finger, is determined. As discussed above, the software can use the location of this point with information about the camera to determine a relative direction to the fingertip. A similar approach can be used with the image 340 captured by the lower camera 308 as illustrated in FIG. 3(*c*), where the hand 342 is located and a direction to the corresponding point 344 determined. As illustrated in FIGS. 3(*b*) and 3(*c*), there can be offsets in the relative positions of the features due at least in part to the separation of the cameras. Further, there can be offsets due to the physical locations in three dimensions of the features of interest. By looking for the intersection of the direction vectors to determine the position of the fingertip in three dimensions, a corresponding input can be determined within a determined level of accuracy. If higher accuracy is needed, higher resolution and/or additional elements can be used in various embodiments. Further, any other stereoscopic or similar approach for determining relative positions in three dimensions can be used as well within the scope of the various embodiments.

When performing motions or gestures to provide input to a device, however, the device in at least some embodiments can require some sort of indication of the portion of the motion or gesture that is intended to be interpreted as input. For example, a user wanting to make a motion from top to bottom with the user's finger first has to move the user's finger up to the top of the motion. Without some indicator or ability to distinguish those portions, the device can potentially register that motion as an "up" motion followed by a "down" motion, or an "up and down" motion. Accordingly, the user in at least some embodiments needs a way to convey to the device that only the downward motion should be used to provide input to the device.

Various triggers or actions can be used to indicate to the device when to start and stop tracking and/or analyzing a motion or gesture for input purposes. For example, a user can tap or squeeze on a button or region of the device with one hand to indicate that the device should track input of the user's other hand. A user also can speak a verbal command to start and/or stop the tracking. Other actions are possible as well, such as tilting or changing an orientation of the device, making a facial gesture, activating a light on an object to be tracked, etc.

Approaches in accordance with various embodiments can utilize a motion or gesture such as a "pinch" gesture in order to determine when to interpret motion as input. For example, FIG. 4(*a*) illustrates an example situation 400 wherein a user's hand 402 is within the field of view of a camera 408 of a computing device 404. In this example, the device tracks the tip of the user's index finger and the tip of the user's thumb. Approaches to determining such features from image information, such as by using image recognition or contour matching algorithms, are well known in the art and as such will not be discussed herein in detail. In this example, a camera 408 captures a series of still images or multiple frames of video information of the user's hand 402. The captured image information is analyzed to determine the relative position or direction of the user's thumb and one or more finger tips. In this example, the device displays a cursor 406, icon, or other graphical element to let the user know the location on the graphical user interface (GUI) where the device is mapping each fingertip. In this example, the device can determine that the thumb and index finger are separated, which indicates that any motion of the hand is not to be interpreted as providing input (or at least text input) to the device.

When the hand is in a position corresponding to an input the user wants to provide, the user can bring together the user's thumb and index finger, as illustrated in the hand position 422 of FIG. 4(*b*). In this example situation, the user's fingertip and thumb positions are mapped by the device to the letter "p" on the virtual keyboard. The interface in this example changes the display of the current position to indicate that the pinch gesture has been detected and movement of the hand will result in input to the device. In this example, the indicator switches to a highlighting 424 of the current input element being selected by the position of the pinch gesture, although other mechanisms such as larger keys, different cursors, or other indicia can be used as well within the scope of the various embodiments. An additional benefit of the pinch gesture is that the gesture helps stabilize the user's fingers, such that the resulting motion will tend to be more precise than if a user was providing input using a single fingertip, for example.

Illustrating the detected positions of both the thumb and index finger as in FIG. 4(*a*) can help the user to ensure that the correct letter is selected for a pinch gesture as illustrated in FIG. 4(*b*). In many instances, the point where the thumb and forefinger will meet is not midway between the positions of the thumb and index finger when unpinched, and depending upon the orientation of the user's hand can be significantly offset from a center point. By showing both detected points moving together, the user can determine when the point is likely to select the improper input, and can adjust the motion of the pinch gesture or the position of the hand to correct the selection. In some embodiments, a third graphical element can be displayed (between the thumb and index finger elements) that predicts where the actual pinch gesture will select on the screen, such that the user can use that element as a guide. The prediction can be based at least in part upon the meeting point of the thumb and a similar finger from one or more previously detected pinch gestures. Various other approaches can be used as well within the scope or the various embodiments.

FIG. 4(*c*) illustrates the user moving his or her hand 422, with the pinch gesture being made, along a path 442 corresponding to the input to be provided to the device. The movement is mapped to the respective positions on the virtual keyboard. In this example, the interface displays a path 444 along the virtual keyboard indicating the mapped motion, such that the user can know whether an undesired or incorrect input is being determined before the user finishes the motion, etc. In this example, the current letter being selected can also have a highlight 446 or other indicator so the user can better determine when to adjust the motion, alter the pattern, make the next direction change in the pattern, or make another such action.

Figure 4A:
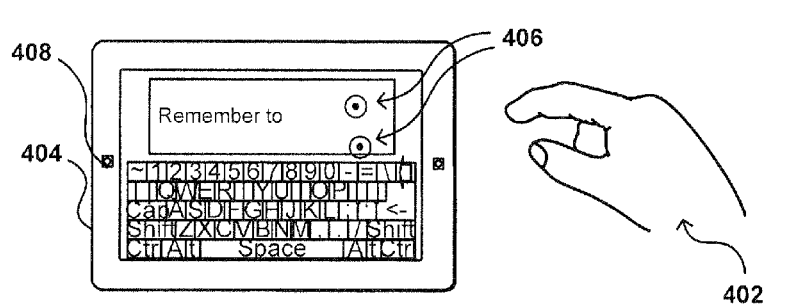
FIGS. 4(a), 4(b), 4(c), and 4(d) illustrate example states or an input process that can be used in accordance with various embodiments.
Figure 4B:
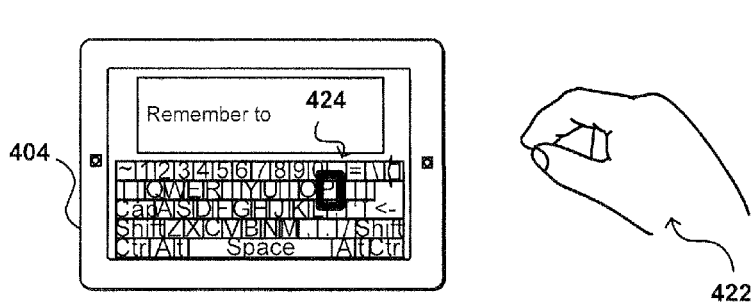
Figure 4C:
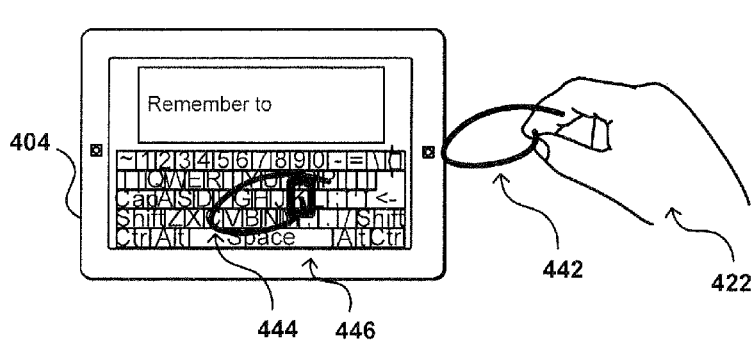
Figure 4D:
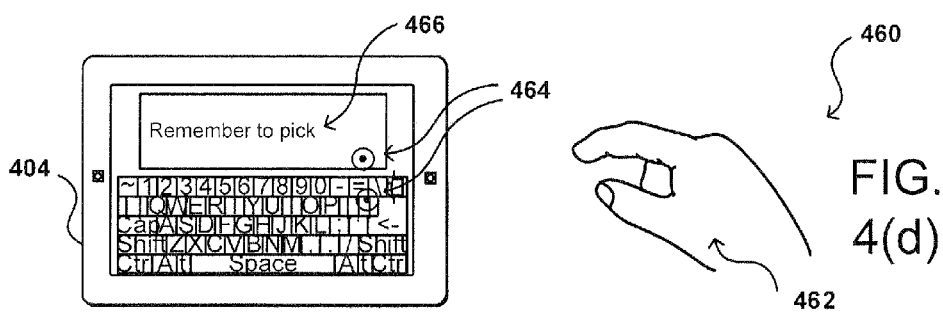

When the user has completed the motion for the input, the user can separate the thumb and index finger, or otherwise stop making the pinch gesture, as illustrated in the situation 460 of FIG. 4(d). When the user's hand 462 is detected to stop making the pinch gesture or the displayed path is outside the virtual keyboard for at least a minimum period of time, for example, the device can stop the tracking of the input motion and analyze the tracked portion of the motion to determine the appropriate input. In some embodiments, the path moving outside the keyboard might be treated differently if the user is making the pinch gesture or not, such as to attempt to include additional input when the path comes back onto the keyboard. The determined input 466 then can be displayed to the user or otherwise managed by the device. The device also can render a graphical indicator showing that the device is no longer tracking input, such as by rendering the cursors 464 on the interface again. As known in the art, various prediction and analysis algorithms can be used to process the input path, using the various combinations of letters or other input included in the path, the relative speeds and changes in direction, and other such information. When the user wants to enter the next word in the text box, the user can move the hand 462 to (or near) the first letter of the next word, make a pinch gesture, and start forming a pattern for the next word. Other gestures or motions can be used as well. For example, if the device did not determine the correct word, the user can make a motion or gesture to indicate that the word was incorrect, or can make a "pinch" motion with respect to a backspace key of the virtual interface to cause the device to delete the whole word, part of the word, or another such portion. Various other inputs can be used as well that utilize motion to mimic, replace, or replicate conventional gestures. For example, two fingertips might be brought into contact with a thumb of the same hand to indicate bolding, underlining, or another such font designation.

Figure 5:
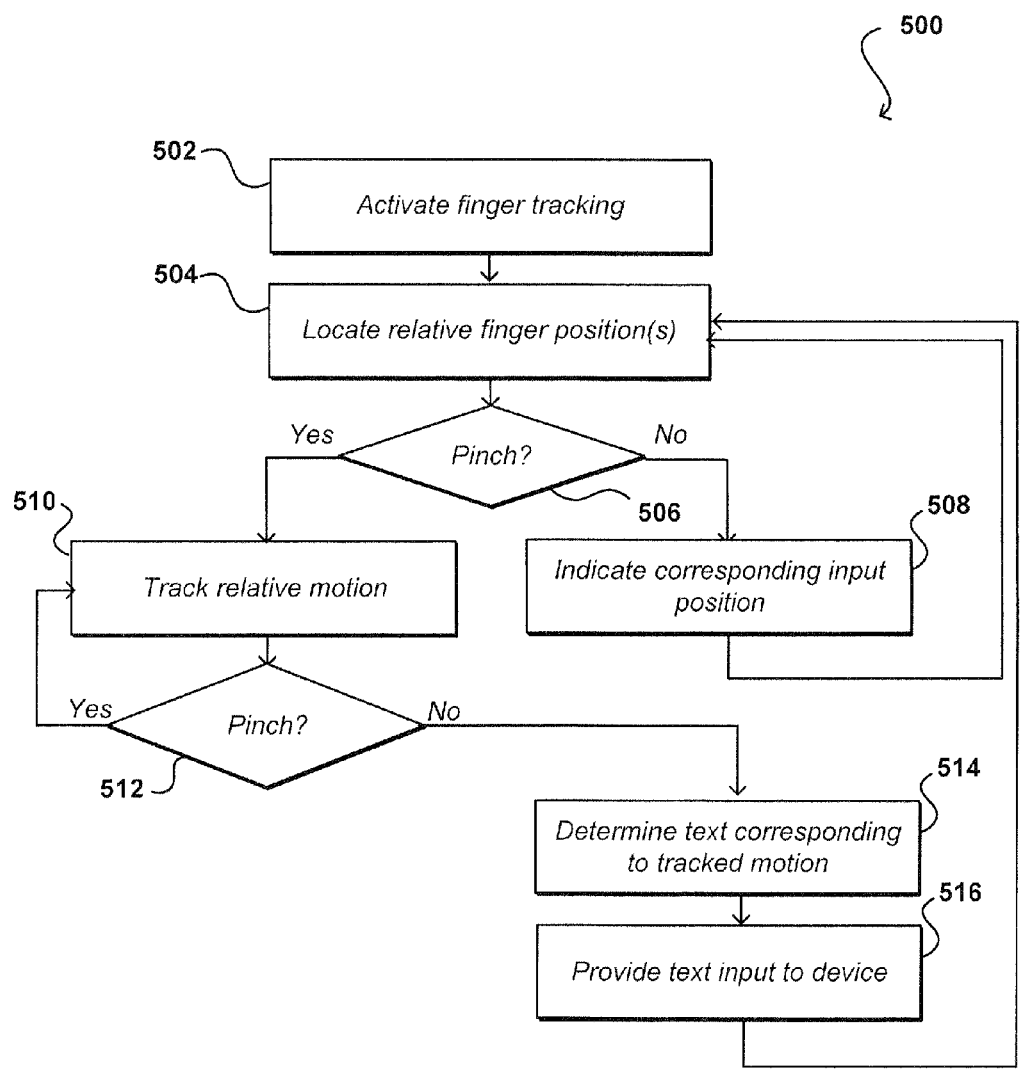
FIG. 5 illustrates an example process for adjusting the transparency of a virtual keypad that can be used in accordance with various embodiments.

FIG. 5 illustrates an example process 500 for providing text input to a computing device using gesture and/or motion input that can be used in accordance with various embodiments. It should be understood that, for any process discussed herein, there can be additional, fewer, or alternative steps performed in similar or alternative orders, or in parallel, within the scope of the various embodiments unless otherwise stated. In this example, finger tracking is activated 502 on a computing device. The tracking can be activated manually, by a user, or automatically in response to an application, activation, startup, or other such action. Further, the feature that the process tracks can be specified or adjusted by a user, provider, or other such entity, and can include any appropriate feature such as a fingertip, hand, thumb, elbow, or other such feature. In at least some embodiments a determination can be made as to whether there is sufficient lighting for image capture and analysis, such as by using a light sensor or analyzing the intensity of captured image information. In at least some embodiments, a determination that the lighting is not sufficient can cause one or more types of illumination to be activated on the device. In at least some embodiments, this can include activating one or more white light LEDs positioned to illuminate a feature within the field of view of at least one camera attempting to capture image information. As discussed elsewhere herein, other types of illumination can be used as well, such as infrared (IR) radiation useful in separating a feature in the foreground from objects in the background of an image. Examples of using IR radiation to assist in locating a feature of a user can be found, for example, in co-pending U.S. patent application Ser. No. 13/198,008, filed Aug. 4, 2011, and entitled "Overcoming Motion Effects in Gesture Recognition," which is hereby incorporated herein by reference.

During the process, one or more selected cameras can capture image information as discussed elsewhere herein. The selected cameras can have fields of view that include at least a portion of the region near a display element or other specified area of the device, such that the cameras can image a feature when approaching that element or area. The captured image information, which can be a series of still images or a stream of video information in various embodiments, can be analyzed to attempt to determine or locate 504 the relative positions of the features to be monitored, in this example the relative position of the user's index finger tip and thumb tip of a visible hand. As discussed elsewhere herein, various image recognition, contour matching, color matching, or other such approaches can be used to identify a feature of interest from the captured image information. When the feature is located and its relative distance determined, another determination can be made 506 as to whether the user is performing an action indicative of input to be provided, in this example the user bringing the monitored fingertips together in a pinch gesture. If the user is not making a pinch gesture, the device can provide some indication 508 of the relative position of the tracked feature(s) on the interface, such as by updating a cursor position or using another approach discussed or suggested herein. The device then can continue to monitor the relative position of the tracked feature(s).

If, on the other hand, the user is detected to make a pinch gesture 506, the device can track the relative motion 510 as long as the user is making the pinch gesture 512 within a field of view of the device. When the user stops making the pinch gesture 512, or otherwise provides indication that the motion should no longer be tracked for input, software executing on the device can attempt to determine 514 text (or other input) corresponding to the tracked motion, and upon making such a determination can provide 516 the determined text input (or other such input) to the device, and where appropriate can provide an indication of the determined input to the user, such as by displaying the text on a display screen of the device. Various other approaches can be used as well as discussed or suggested elsewhere herein.

In at least some embodiments, it can be advantageous for the device to also determine an approximate plane of movement of the fingertip with respect to the device. For example, different scales of motion will be detected for different planes that are at different distances. Further, the distance from a device to a finger moving across a plane will change as the finger moves across the plane, but that change in distance may not be intended to be registered as input in addition to the x/y movement in the plane. Similarly, speeds and distances of motion of a gesture appear differently in the captured image information based at least in part upon the distance to the plane of motion. Being able to adapt to different planes enables the user to be able to make the same type of motion for a gesture, without having to do very large gestures at large distances from the device or very small gestures when near the device, etc. Further, certain users will make different size motions for the same gesture, such that the device can also look at the identity of the user in addition to the plane of motion to determine how to determine motion of a tracked feature. As discussed, certain embodiments can highlight various elements on the display for certain positions relative to the device, which can force a user to make motions of a certain size or length in at least some embodiments. In some embodiments, a user can configure the size and/or speed of motion detection, such as is configurable for mouse movement and other types of input. In other embodiments, a device can learn the motions of a particular user over time.

While many of the examples discussed herein relate to text entry and element selection, it should be understood that various other uses can benefit from approaches discussed herein as well. For example, a user might utilize motion and gesture input for a drawing or paint program. When a user wants to create a shape, for example, the user can make a pinch gesture and form the shape with the user's fingers, which can then be reflected on the screen. When the user is done with the shape the user can unpinch the fingers, which can prevent subsequent movement of the fingers from being used as input. The pinch motion can be used to provide other input as well, such as to select colors, change line types, move items on the screen, etc.

Similarly, a user might sign in to a device by making a gesture, sign, or signature. The user can do this using remote gestures, where the pinch gesture is used to designate the beginning and end of the sign in motion. Such motions can be used to perform other tasks as well, such as to circle items of interest, highlight sections of information, annotate a page of content, and the like. In some embodiments, a user can select an object using a pinch gesture and "drag" that object to a desired location using motion of the user's fingers. When the object is at the desired location, the user can unpinch the fingers to "drop" the item at that location. Such an approach can also be used to perform a search operation, such as where a user drags a copy of an item and drops that item on a search element, which searches for related items or content.

A user also can use such gestures and motions with a mapping program. For example, a user can draw an intended route on a map, or select destinations for the program to utilize. In some embodiments, the user can adjust a recommended route by "dragging" a point of the route to another location on the map. A user can also potentially draw a circle around points of interest that the program can use to recommend a route or itinerary. Various other options can be utilized as well within the scope of the various embodiments.

In some embodiments, a computing device might utilize head tracking to attempt to determine a point of view of the user, which can help to interpret where the user is attempting to provide input. For example, a device can locate and track the user's head position using an image-based approach such as that described with respect to FIG. 3(a). The device can determine the location of the fingertip not only to the device, but to the user's head or eyes, which can help the device to interpret where the user likely intends to provide input. Such an approach can also help to interpret motion of the fingers, as motion of the fingers together with motion of the user might not be intended to provide input.

In some embodiments, the device can perform three-dimensional modeling of the environment including the user's fingers and head positions, such as by utilizing stereo cameras or a distance sensor with a camera, etc. The three-dimensional modeling can provide very accurate results, but also can be very computationally expensive for certain devices.

Certain embodiments can also utilize specific input modes in order to ensure that gestures are properly interpreted. For example, in a text input mode a pinch gesture might be used to designate input, while in a browsing mode a pinch gesture might be used to control a zoom level of the display. By separating the gestures by mode, a device can reduce the likelihood of confusing these gestures, or other gestures with somewhat similar motions or shapes. In some embodiments, a user can manually switch between modes, such as by making a unique gesture, speaking a voice command, squeezing a pressure-sensitive area of the device, etc.

A pattern recognition or text input algorithm can also have some intelligence built in to assist with selecting the appropriate word or input. For example, the pattern recognition can have an "auto-correct" type feature, wherein a word that might be off by a letter that is adjacent to another letter on a keyboard might automatically be determined to be the intended input, given a minimum amount of certainty or confidence, etc. Various approaches for handling small deviations in pattern matching, as well as performing auto-correcting of text input, are well known in the art and as such will not be discussed in detail herein.

As mentioned, various approaches can be used to attempt to locate and track specific features over time. One such approach utilizes ambient-light imaging with a digital camera (still or video) to capture images for analysis. In at least some instances, however, ambient light images can include information for a number of different objects and thus can be very processor and time intensive to analyze. For example, an image analysis algorithm might have to differentiate the hand from various other objects in an image, and would have to identify the hand as a hand, regardless of the hand's orientation. Such an approach can require shape or contour matching, for example, which can still be relatively processor intensive. A less processor intensive approach can involve separating the hand from the background before analysis.

In at least some embodiments, a light emitting diode (LED) or other source of illumination can be triggered to produce illumination over a short period of time in which an image capture element is going to be capturing image information. The LED can illuminate a feature relatively close to the device much more than other elements further away, such that a background portion of the image can be substantially dark (or otherwise, depending on the implementation). In one example, an LED or other source of illumination is activated (e.g., flashed or strobed) during a time of image capture of at least one camera or sensor. If the user's hand is relatively close to the device the hand will appear relatively bright in the image. Accordingly, the background images will appear relatively, if not almost entirely, dark. This approach can be particularly beneficial for infrared (IR) imaging in at least some embodiments. Such an image can be much easier to analyze, as the hand has been effectively separated out from the background, and thus can be easier to track through the various images. Further, there is a smaller portion of the image to analyze to attempt to determine relevant features for tracking. In embodiments where the detection time is short, there will be relatively little power drained by flashing the LED in at least some embodiments, even though the LED itself might be relatively power hungry per unit time.

Such an approach can work both in bright or dark conditions. A light sensor can be used in at least some embodiments to determine when illumination is needed due at least in part to lighting concerns. In other embodiments, a device might look at factors such as the amount of time needed to process images under current conditions to determine when to pulse or strobe the LED. In still other embodiments, the device might utilize the pulsed lighting when there is at least a minimum amount of charge remaining on the battery, after which the LED might not fire unless directed by the user or an application, etc. In some embodiments, the amount of power needed to illuminate and capture information using the gesture sensor with a short detection time can be less than the amount of power needed to capture an ambient light image with a rolling shutter camera without illumination.

It also should be understood that it can also be important in at least some embodiments for the software to know the relative position of the cameras or other image capture elements on the device. For example, image information can be analyzed to determine directions or position vectors to features, but those determinations are relative to a center point (or other position) of the camera capturing that image information. In order to properly combine the vectors from different images to determine an intersection point, the separation between the cameras capturing those images should also be taken into account in at least some embodiments. Various approaches for three-dimensional mapping or modeling using stereoscopic imaging or other such approaches based at least in part upon camera separation can be used as known or used in the art. Other approaches such as active capacitive, passive capacitive, and ultrasonic approaches can be used for ringer detection, and processes such as ambient or IR imaging, at one or more wavelengths, can be used for eye detection, among other such processes.

In some embodiments, a computing device might utilize one or more motion-determining elements, such as an electronic gyroscope, to attempt to assist with location determinations. For example, a rotation of a device can cause a rapid shift in objects represented in an image, which might be faster than a position tracking algorithm can process. By determining movements of the device during image capture, effects of the device movement can be removed to provide more accurate three-dimensional position information for the tracked user features.

Figure 6:
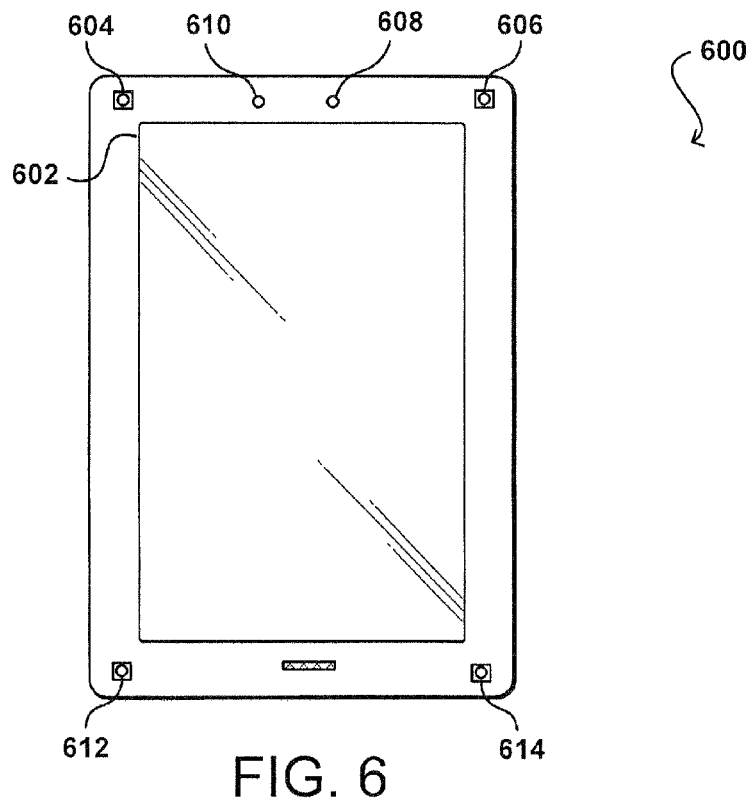
FIG. 6 illustrates an example computing device that can be used in accordance with various embodiments.

FIG. 6 illustrates an example computing device 600 that can be used to perform methods in accordance with various embodiments discussed and suggested herein. In this example, the device has four image capture elements 604, 606, 612, 614 positioned at various locations on the same side of the device as a display element 602, enabling the device to capture image information about a user of the device during typical operation where the user is at least partially in front of the display element. In this example, each capture element is a camera capable of capturing image information over a visible and/or infrared (IR) spectrum, and in at least some embodiments can select between visible and IR operational modes. It should be understood, however, that there can be fewer or additional elements of similar or alternative types in other embodiments, and that there can be combinations of cameras, infrared detectors, gesture sensors, and other such elements used with various devices.

In this example, a light sensor 608 is included that can be used to determine an amount of light in a general direction of objects to be captured and at least one illumination element 610, such as a white light emitting diode (LED) or infrared (IR) emitter, as discussed elsewhere herein, for providing illumination in a particular range of directions when, for example, there is insufficient ambient light determined by the light sensor or reflected IR radiation is to be captured. The device can have a material and/or components that enable a user to provide "squeeze" input to the device by applying pressure at one or more locations. A device casing can also include touch-sensitive material that enables a user to provide input by sliding a finger or other object along a portion of the casing. Various other elements and combinations of elements can be used as well within the scope of the various embodiments as should be apparent in light of the teachings and suggestions contained herein.

Figure 7:
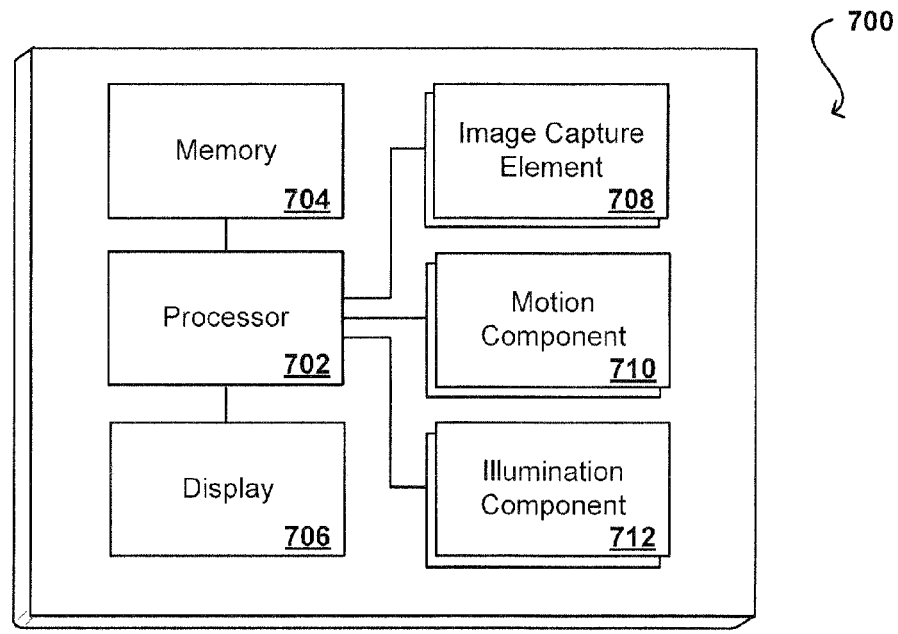
FIG. 7 illustrates an example configuration of components of a computing device such as that illustrated in FIG. 6.

In order to provide various functionality described herein, FIG. 7 illustrates an example set of basic components of a computing device 700, such as the device 600 described with respect to FIG. 6. In this example, the device includes at least one central processor 702 for executing instructions that can be stored in at least one memory device or element 704. As would be apparent to one of ordinary skill in the art, the device can include many types of memory, data storage or non-transitory computer-readable storage media, such as a first data storage for program instructions for execution by the processor 702, the same or separate storage can be used for images or data, a removable storage memory can be available for sharing information with other devices, etc. The device typically will include some type of display element 706, such as a touch screen, electronic ink (e-ink), organic light emitting diode (OLED) or liquid crystal display (LCD), although devices such as portable media players might convey information via other means, such as through audio speakers. In at least some embodiments, the display screen provides for touch or swipe-based input using, for example, capacitive or resistive touch technology.

As discussed, the device in many embodiments will include at least one image capture element 708, such as one or more cameras that are able to image a user, people, or objects in the vicinity of the device. An image capture element can include, or be based at least in part upon any appropriate technology, such as a CCD or CMOS image capture element having a determined resolution, focal range, viewable area, and capture rate. The image capture elements can also include at least one IR sensor or detector operable to capture image information for use in determining gestures or motions of the user. The example device includes at least one motion determining component 710, such as an electronic gyroscope used to determine motion of the device for assistance in input determination. The device also can include at least one illumination element 712, as may include one or more light sources (e.g., white light LEDs, IR emitters, or flashlamps) for providing illumination and/or one or more light sensors or detectors for detecting ambient light or intensity, etc.

The example device can include at least one additional input device able to receive conventional input from a user. This conventional input can include, for example, a push button, touch pad, touch screen, wheel, joystick, keypad, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual (e.g., gesture) and audio (e.g., spoken) commands such that a user can control the device without having to be in contact with the device.

Figure 8:
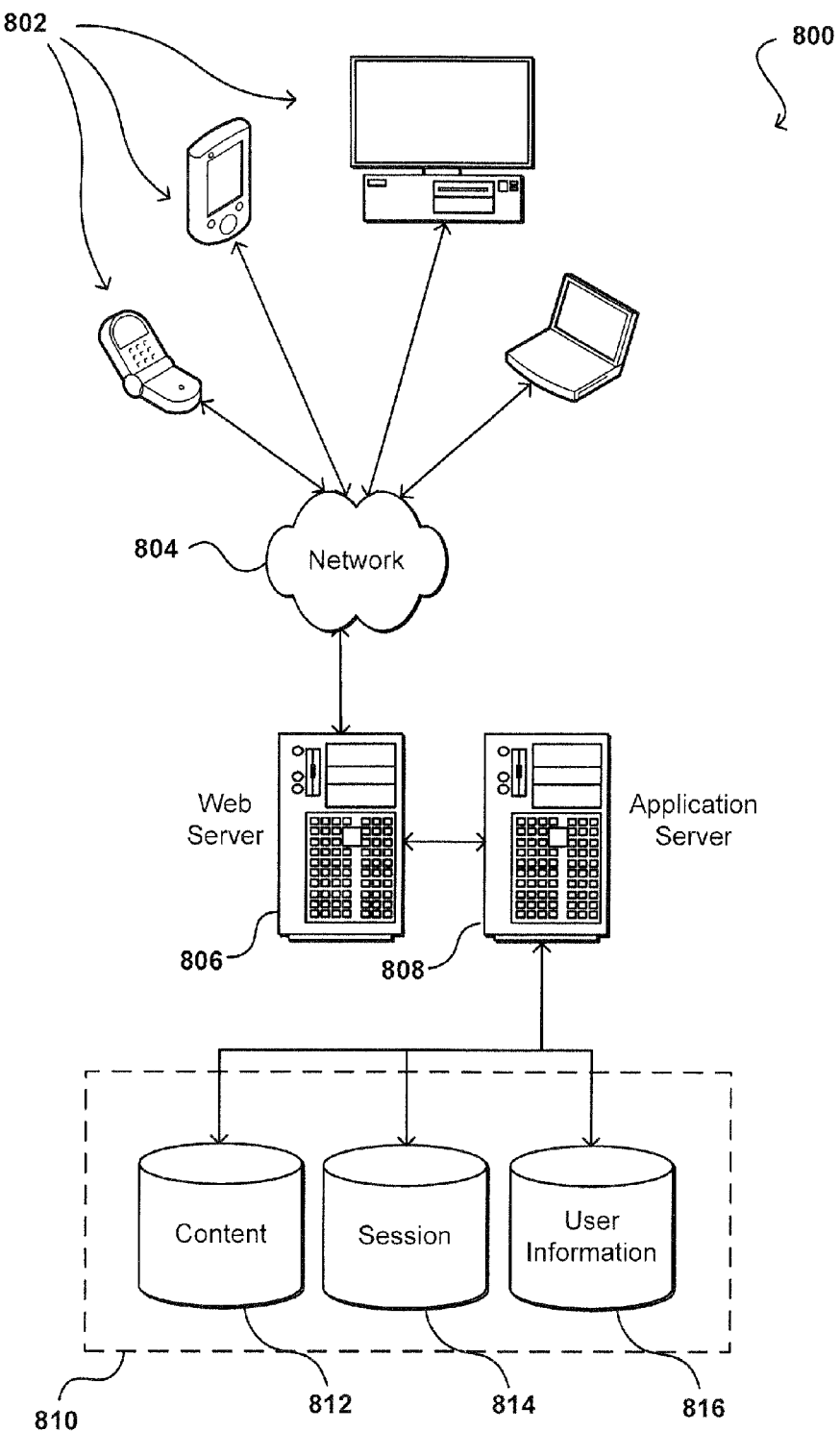
FIG. 8 illustrates an example environment in which various embodiments can be implemented.

As discussed, different approaches can be implemented in various environments in accordance with the described embodiments. For example, FIG. 8 illustrates an example of an environment 800 for implementing aspects in accordance with various embodiments. As will be appreciated, although a Web-based environment is used for purposes of explanation, different environments may be used, as appropriate, to implement various embodiments. The system includes an electronic client device 802, which can include any appropriate device operable to send and receive requests, messages or information over an appropriate network 804 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 806 for receiving requests and serving content in response thereto, although for other networks, an alternative device serving a similar purpose could be used, as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 808 can include any appropriate hardware and software for integrating with the data store 810 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 806 in the form of HTML, XML or another appropriate structured language in this example. The handling of all requests and responses, as well as the delivery of content between the client device 802 and the application server 808, can be handled by the Web server 806. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing content (e.g., production data) 812 and user information 816, which can be used to serve content for the production side. The data store is also shown to include a mechanism for storing log or session data 814. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keypad, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
    capturing image information using a sensor associated with a computing device;
    receiving a first input, the first input representing the beginning of a period of time for determining motion information;
    determining, from the image information and within the period of time, the motion information, the motion information associated with a feature of a user that is not in contact with a display surface associated with the computing device and is moving substantially parallel to the display surface;
    displaying on the display surface, within the period of time, motion of one or more first graphical elements corresponding to the motion information;
    displaying on the display surface, within the period of time, at least a substantial portion of a QWERTY keyboard;
    determining, from the motion information, a sequence of positions of the feature relative to the display surface within the period of time;
    determining that the sequence of positions corresponds to a sequence of keys of the QWERTY keyboard;
    determining that the sequence of keys corresponds to a word including two or more letters; and
    receiving the word as a single input to the computing device.

2. The computer-implemented method of claim 1, further comprising:
    highlighting each key corresponding to the word.

3. The computer-implemented method of claim 1, further comprising:
    displaying on the display surface, within a second period of time, a first set of values for a set of pixels of an editable image; and
    determining, from the motion information, that a second sequence of positions of the feature relative to the display surface within the second period of time corresponds to a second set of values for the set of pixels.

4. The computer-implemented method of claim 1, further comprising:
    displaying on the display surface, within the period of time, a virtual cursor.

5. The computer-implemented method of claim 4, further comprising:
    executing a search relating to the word.

6. The computer-implemented method of claim 1, further comprising:
    determining, from the motion information, that a second sequence of positions relative to the display surface within a second period of time corresponds to a sign-in gesture.

7. The computer-implemented method of claim 1, further comprising:
    determining, from the motion information, that a second sequence of positions of the feature relative to the display surface within a second period of time corresponds to annotation of content.

8. The computer-implemented method of claim 1, further comprising:
    displaying on the display surface, within a second period of time, a plurality of geographic routes; and
    determining, from the motion information, that a second sequence of positions of the feature relative to the display surface within the second period of time corresponds to a route of the plurality of geographic routes.

9. A computing device, comprising:
a processor; and
memory including instructions that, upon being executed by the processor, cause the computing device to:
capture image information using a sensor associated with the computing device;
receive a first input, the first input representing the beginning of a period of time for determining motion information;
determine, from the image information and within the period of time, motion information, the motion information associated with a feature of a user that is not in contact with a display surface associated with the computing device and is moving substantially parallel to the display surface;
display on the display surface, within the period of time, motion of one or more first graphical elements corresponding to the motion information;
display on the display surface, within the period of time, at least a substantial portion of a QWERTY keyboard;
determine, from the motion information, a sequence of positions of the feature relative to the display surface within the period of time;
determine that the sequence of positions corresponds to a sequence of keys of the QWERTY keyboard;
determine that the sequence of keys corresponds to a word including two or more letters; and
receive the word as a single input to the computing device.

10. The computing device of claim 9, wherein the first input includes the user bringing into contact a tip of a finger of the user and a tip of a thumb of the user.

11. The computing device of claim 10, wherein the instructions, upon being executed, further cause the computing device to:
determine that the tip of the finger and the tip of the thumb are no longer in contact; and
suspend determination of the motion information.

12. The computing device of claim 9, wherein the instructions, upon being executed, further cause the computing device to:
display on the display surface, within a second period of time, a plurality of geographic routes; and
determine, from the motion information, that a second sequence of positions of the feature relative to the display surface within the second period of time corresponds to a route of the plurality of geographic routes.

13. The computing device of claim 9, wherein the instructions, upon being executed, further cause the computing device to:
display, within a second period of time, one or more second graphical elements associated with one or more controls for a zoom level; and
determine, from the motion information, that a second sequence of positions of the feature relative to the display surface within the second period of time corresponds to a zoom level.

14. The computing device of claim 9, wherein the instructions, upon being selected, further cause the computing device to:
determine, from the motion information, that a second sequence of positions of the feature relative to the display surface within a second period of time corresponds to a signature of the user.

15. The computing device of claim 9, wherein the one or more first graphical elements include a virtual cursor.

16. A non-transitory computer-readable storage medium storing instructions that, upon being executed by a processor of a computing device, cause the computing device to:
capture image information using a sensor associated with the computing device;
receive a first input, the first input representing the beginning of a period of time for determining motion information;
determine, from the image information and within the period of time, motion information, the motion information associated with a feature of a user that is not in contact with a display surface associated with the computing device and is moving substantially parallel to the display surface;
display on the display surface, within the period of time, motion of one or more first graphical elements corresponding to the motion information;
display on the display surface, within the period of time, at least a substantial portion of a QWERTY keyboard;
determine, from the motion information, a sequence of positions of the feature relative to the display surface within the period of time;
determine that the sequence of positions corresponds to a sequence of keys of the QWERTY keyboard;
determine that the sequence of keys corresponds to a word including two or more letters; and
receive the word as a single input to the computing device.

17. The non-transitory computer-readable storage medium of claim 16, wherein the instructions, upon being executed, further cause the computing device to:
display on the display surface, within a second period of time, a first set of values for a set of pixels of an editable image; and
determine, from the motion information, that a second sequence of positions of the feature relative to the display surface within the second period of time corresponds to a second set of values for the set of pixels.

18. The non-transitory computer-readable storage medium of claim 16, wherein the one or more first graphical elements include a virtual cursor.

19. The non-transitory computer-readable storage medium of claim 16, wherein the instructions, upon being executed, further cause the computing device to:
determine that a tip of a finger and a tip of a thumb are no longer in contact; and
suspend determination of the motion information.

* * * * *